(12) United States Patent
Jordan (10) Patent No.: US 10,787,783 B2
(45) Date of Patent: Sep. 29, 2020

(54) SYSTEM AND METHOD FOR EXTRACTING POWER FROM TIDES

(71) Applicant: RED TO BLUE LIMITED, London (GB)

(72) Inventor: Stephen Jordan, Headley Berkshire (GB)

(73) Assignee: Red to Blue Limited, London (GB)

(*) Notice: Subject to any disclaimer, the term of this patent is extended or adjusted under 35 U.S.C. 154(b) by 0 days.

(21) Appl. No.: 16/312,755

(22) PCT Filed: Jun. 23, 2017

(86) PCT No.: PCT/GB2017/051842
§ 371 (c)(1),
(2) Date: Dec. 21, 2018

(87) PCT Pub. No.: WO2017/221023
PCT Pub. Date: Dec. 28, 2017

(65) Prior Publication Data
US 2019/0169812 A1  Jun. 6, 2019

(30) Foreign Application Priority Data
Jun. 23, 2016  (GB) .................. 1611001.7

(51) Int. Cl.
*E02B 9/08* (2006.01)
*F03B 13/26* (2006.01)

(52) U.S. Cl.
CPC ............. *E02B 9/08* (2013.01); *F03B 13/264* (2013.01); *F03B 13/266* (2013.01); *F03B 13/268* (2013.01); *Y02E 10/28* (2013.01); *Y02E 10/38* (2013.01)

(58) Field of Classification Search
CPC ............ Y02E 10/38; Y02E 10/28; E02B 9/08
USPC .............................................. 405/75, 76, 77
See application file for complete search history.

(56) References Cited

U.S. PATENT DOCUMENTS

| | | | | |
|---|---|---|---|---|
| 954,999 A * | 4/1910 | Roell | .................. | E02B 9/00 |
| | | | | 405/75 |
| 1,147,082 A * | 7/1915 | Farra | .................. | E02B 9/08 |
| | | | | 405/76 |
| 1,294,808 A * | 2/1919 | Jenkins | .................. | F03B 13/24 |
| | | | | 405/76 |

(Continued)

FOREIGN PATENT DOCUMENTS

| CH | 666501 A5 | 7/1988 |
|---|---|---|
| CN | 101235789 A | 8/2008 |

(Continued)

*Primary Examiner* — Frederick L Lagman
(74) *Attorney, Agent, or Firm* — Reichel Stohry Dean LLP; Mark C. Reichel; Natalie J. Dean (57) ABSTRACT

There is a desire to be able to generate electrical power from the tides without turbines posing an unacceptable hazard to sea traffic and/or life, and in particular without causing such sea traffic and/or life to alter their behaviour in response to the placement of turbines and/or other structures. According to the present invention, a tunnel (7) is provided at a height substantially between the low tide height and high tide height; a power take-off system (11) is configured to convert movement of water in the tunnel into usable energy. In this way, a tunnel inlet (5) may be placed at a location that does not interfere with shipping and/or the natural environment.

7 Claims, 4 Drawing Sheets

(56) References Cited

U.S. PATENT DOCUMENTS

| | | | |
|---|---|---|---|
| 1,690,787 A | 11/1928 | Knight | |
| 4,013,379 A | 3/1977 | Bolding | |
| 4,327,297 A * | 4/1982 | Harrison | F03B 13/264 290/53 |
| 5,074,710 A | 12/1991 | Gorlov | |
| 5,105,094 A * | 4/1992 | Parker | F03B 13/148 290/42 |
| 5,575,587 A | 11/1996 | Chen | |
| 6,450,732 B1 * | 9/2002 | Boccotti | E02B 3/06 405/76 |
| 6,781,253 B2 * | 8/2004 | Newman | F03B 13/24 290/42 |
| 7,153,060 B1 * | 12/2006 | Bennion | E02B 3/00 405/75 |
| 9,039,326 B1 * | 5/2015 | Novek | E02B 9/08 405/76 |
| 2002/0162326 A1 | 11/2002 | Brumfield | |
| 2004/0022584 A1 * | 2/2004 | Sherman | E02B 9/08 405/75 |
| 2007/0290508 A1 * | 12/2007 | Burcik | F03B 13/1855 290/53 |
| 2008/0093859 A1 | 4/2008 | Catlin | |
| 2008/0217919 A1 | 9/2008 | Ayntrazi | |
| 2010/0158705 A1 | 6/2010 | Guinard | |
| 2010/0219639 A1 | 9/2010 | Thompson, Jr. | |
| 2010/0269929 A1 * | 10/2010 | Dodds | E02B 9/06 137/544 |
| 2012/0267897 A1 | 10/2012 | Williams | |

FOREIGN PATENT DOCUMENTS

| | | | |
|---|---|---|---|
| CN | 102720629 A | 10/2012 | |
| CN | 203272010 U | 11/2013 | |
| CN | 103670893 A | 3/2014 | |
| CN | 103925144 A | 7/2014 | |
| CN | 203702448 U | 7/2014 | |
| CN | 204003259 U | 12/2014 | |
| CN | 104863082 A | 8/2015 | |
| CN | 105178642 A | 12/2015 | |
| DE | 553144 C | 6/1932 | |
| DE | 102010044607 A1 | 3/2012 | |
| EP | 2299107 A1 | 3/2011 | |
| FR | 2298705 A1 | 8/1976 | |
| FR | 2461194 A1 | 1/1981 | |
| FR | 2468764 A | 5/1981 | |
| GB | 17711 A | 10/1904 | |
| GB | 3844 A | 2/1910 | |
| GB | 27049 A | 4/1912 | |
| GB | 109353 A | 9/1917 | |
| GB | 156315 A | 10/1919 | |
| GB | 154188 A | 11/1919 | |
| GB | 384844 A | 2/1932 | |
| GB | 464317 A | 8/1936 | |
| GB | 633983 A | 11/1947 | |
| GB | 2276210 A * | 9/1994 | F03B 13/266 |
| GB | 2302709 A * | 1/1997 | F03B 13/268 |
| GB | 2403986 A | 1/2005 | |
| GB | 2454913 A | 5/2009 | |
| GB | 2459205 A * | 10/2009 | F03B 13/26 |
| GB | 2513178 A | 10/2014 | |
| JP | 1130066 A | 5/1989 | |
| JP | 2223681 A | 9/1990 | |
| JP | 754753 A | 2/1995 | |
| JP | 2002021699 A | 1/2002 | |
| JP | 2011085003 A | 4/2011 | |
| KR | 100250658 B1 | 4/2000 | |
| KR | 0055632005 A | 3/2005 | |
| KR | 1020090096586 A | 11/2009 | |
| KR | 20130095617 A | 8/2013 | |
| KR | 20140092216 A | 7/2014 | |
| KR | 20150108554 A | 9/2015 | |
| SU | 1760149 A1 | 9/1992 | |
| TW | 200842250 A | 11/2008 | |
| TW | 201520424 A | 6/2015 | |
| WO | 9523259 A1 | 8/1995 | |
| WO | 2005098143 A1 | 10/2005 | |
| WO | 2008084507 A1 | 7/2008 | |
| WO | 2013009198 A1 | 1/2013 | |
| WO | 2015000366 A1 | 1/2015 | |

* cited by examiner

SYSTEM AND METHOD FOR EXTRACTING POWER FROM TIDES

PRIORITY

The present application is related to, and claims the priority benefit of, and is a 35 U.S.C. 371 national stage application of, International Patent Application Serial No. PCT/GB2017/051842, filed Jun. 23, 2017, which is related to, and claims the priority benefit of, Great Britain Patent Application Serial No. 1611001.7, filed Jun. 23, 2017. The contents of each of these applications are hereby incorporated by reference in their entirety into this disclosure.

TECHNICAL FIELD

The present invention relates generally to a system and method for extracting power from tides.

BACKGROUND

Tides are the largely periodic movement of vast quantities of sea water around the world produced by the gravitational effects of the moon and sun. This movement of water represents an immense source of energy, as potential energy (e.g. at high or low tide) and/or kinetic energy (e.g. during ebb or flood tides).

Various methods of extracting this energy to perform useful work (e.g. electrical power generation) have been proposed.

For instance, tidal stream generators use kinetic energy of moving water during flood and/or ebb to drive turbines. These are typically placed in areas where the speed of water movement is relatively high during ebb or flood tides, for instance in narrow channels between islands and/or around headlands, and in particular relatively close to shore. Regrettably, these are also locations where shipping and/or wildlife may concentrate. Typically being anchored to the sea bed, and operating close to the surface where the water moves quickest, means that there are negative environmental impacts (including those affecting migratory patterns, strikes, acoustics disturbance, etc.) as well as being potential shipping hazards.

An alternative is to use a tidal barrage or tidal lagoon, in which a portion of coastline is confined by a retaining wall or dam or the lagoon is offshore and therefore surrounded by a retaining wall. At high tide, water is held in a basin (e.g. an artificial lagoon or estuary mouth) behind the dam, which can be released on demand to drive turbines. Flow of water into the basin may also generate power by driving the turbines. Regrettably, the dam prevents access to the basin behind for shipping, and can drastically change the ecosystem in and around the basin.

In addition, the destructive power of the oceans makes for high capital, construction and maintenance costs as well as relatively short equipment lifespans.

There is therefore a desire for a method of generating electrical power from the tides without turbines posing a hazard to traffic and/or organisms, and in particular without causing such traffic and/or organisms to alter their behaviour in response to the placement of turbines and/or other structures.

BRIEF SUMMARY

According to a first aspect of the present invention, there is provided a system for extracting power from tides, the system comprising: a seawater inlet; a tunnel extending from the inlet into adjacent land mass, the tunnel comprising: a substantially horizontal storage tunnel portion disposed within the land mass at a height such that at least a portion of the storage tunnel's cross-section is located substantially between a low neap tide height and high neap tide height at the inlet; and a power take-off system configured to convert movement of water in the tunnel into usable energy.

In this way, the seawater inlet may be placed at a location that does not interfere with shipping and/or the natural environment.

The seawater inlet may be disposed below a low tide height. In this way, the seawater inlet may be concealed from view and will not interfere with vessels within the region of the inlet. In addition, best use may therefore be made of the full tidal range of the sea adjacent to the inlet.

In particular, the seawater inlet may be disposed below a low tide height at the inlet that may be a local low tide height, mean low water at the inlet, mean low water spring at the inlet, the lowest low water at the inlet, the lowest spring low water at the inlet.

The seawater inlet may be disposed at least 0.5 m below the low tide height at the inlet, in particular at least 1 m below the low tide height at the inlet, more particularly at least 2 m below the low tide height at the inlet.

The seawater inlet may be disposed at most 4 m below the low tide height at the inlet, in particular at most 3 m below the low tide height at the inlet, more particularly approximately 2 m below the low tide height at the inlet. In particular, the seawater inlet may be located in relatively shallow water to avoid shipping routes.

In this way, the seawater inlet may be submerged at all times. The seawater inlet may be at substantially any depth, for example, 0.5 m, 10 m, 25 m or 50 m below the low tide height.

The seawater inlet may be protected with a screen, for example a grille, grating sieve and/or mesh. In this way, inadvertent introduction of solid matter into the tunnel may be prevented and/or substantially reduced.

The tunnel may extend from the inlet into adjacent bedrock. In this way, the tunnel may be constructed by drilling/boring, and no pipes are necessary on the seabed, shoreline or coast that would otherwise be a hazard to shipping, be unsightly, or interfere with the natural environment.

The storage tunnel portion may be constructed by drilling/boring, as above.

The storage tunnel portion may extend substantially locally horizontally; that is, following the curvature of the earth thus maintaining a substantially constant height with respect to sea level. In particular, the storage tunnel portion may extend at less than 20 degrees to the horizontal, in particular less than 10 degrees, more particularly less than 5 degrees. Additionally or alternatively, the storage tunnel portion may slope along its length to have a lower extent substantially below a low tide height to an upper extent substantially above a high tide height. The slope may be substantially zero degrees. For instance when the height of the storage tunnel portion is greater than or equal to the neap tidal range, the maximum change in volume of water within the storage tunnel portion over the course of a single tide will be achieved when the storage tunnel portion has a slope of approximately zero degrees. The lower extent may be a base of the storage tunnel portion, the upper extent may be a ceiling of the storage tunnel portion. The low tide height may be a low neap tide height, mean low water height, low spring tide height or lowest low spring tide height. The high tide height may be a highest spring tide height, a high spring tide height, mean high water height, or a high neap tide height.

The base of the storage tunnel portion may be substantially at, above and/or below a low tide height. The low tide height may be a local low tide height at the inlet, mean low water at the inlet, mean low water spring at the inlet, mean low water neap at the inlet, the lowest low water at the inlet, the highest low water at the inlet, the lowest spring low water at the inlet, and/or the highest neap low water at the inlet. The ceiling of the storage tunnel portion may be substantially at, above and/or below a high tide height. The high tide height may be a local high tide height at the inlet, mean high water at the inlet, mean high water spring at the inlet, mean high water neap at the inlet, the highest high water at the inlet, the lowest high water at the inlet, the highest spring high water at the inlet, and/or the lowest neap high water at the inlet.

In this way, most efficient use of the tidal range may be achieved. In particular, a relatively small change in the height of the incoming and/or outgoing tide leads to a relatively large change in the volume of seawater present in the storage tunnel portion.

The system may further comprise a passage extending from the storage tunnel portion of the tunnel to the external atmosphere. The power take-off system may be configured to convert movement of air through the passage, propelled by movement of water in the tunnel into usable energy. In this way, the power take-off system may be located on dry land for ease of construction/servicing.

The tunnel may be enclosed. In particular, fluid within the tunnel may only enter or leave the tunnel via the inlet and/or via the passage. In this way, a change in the amount of water within the storage tunnel portion leads to a substantially identical (but opposite) change in the amount of air within the storage tunnel portion.

The tunnel may further comprise a connecting tunnel portion arranged such that seawater entering at the seawater inlet passes through the connecting tunnel portion to arrive at the storage tunnel portion.

The power take-off system may comprise water-flow turbines disposed within the tunnel. In this way, power may be generated directly from the tidal flow. The water flow (or 'hydraulic') turbines may be swung around or located in such a position as to be able to function in a unidirectional manner and thereby be more efficient; however, bi-directional turbines are also envisaged. The turbine may comprise a shrouded tidal turbine/Venturi shrouded turbine/Venturi shaped tunnel. The turbine may be configured and/or arranged such that substantially only the blades and/or shaft of the turbine are exposed to seawater; the remainder of the turbine being located outside of the tunnel. The turbine may comprise any form of turbine conventionally used in tidal stream, tidal lagoon and/or tidal barrage technologies.

The system further comprises a valve disposed within the tunnel. The valve may be a gate. The valve/gate may be configured to control flow through the tunnel. For instance, the valve may be configured for substantially binary (e.g. open-closed) operation. Alternatively, the valve may be configured for variable operation; that is, the valve may be closable, and/or openable to a variety of different degrees to allow a variable flow therethrough. In this way, flow within the tunnel may be controlled, automatically and/or by external user control. For instance, flow may be reduced to decrease an amount of power generation, and/or to distribute power generation over time. In addition, flow in the tunnel may be stopped entirely to permit maintenance and/or inspection, etc.

The system may comprise only one valve, or a plurality of valves. The valves may be located at substantially any point in the tunnel(s). In particular, the valves may be placed either side of water-flow turbines (or simply on the seaward side of the turbines), such that maintenance may be performed during any tidal state. A valve or further valve may be placed adjacent to the seawater inlet, again to facilitate maintenance of the system and one in the storage tunnel portion. Alternatively or additionally, valves may be placed in the storage tunnel portion, adjacent to the passage, or otherwise spaced from the passage.

The tunnel may have a substantially circular cross-section. In this way, the tunnel may possess relatively high structural integrity, and potentially could have a substantially maintenance-free lifetime of hundreds or thousands of years, particularly when tunnelled into suitable bedrock. Such tunnels would possess very high security against terrorism and/or natural disasters, particularly when compared to other forms of power station including nuclear, fossil fuel, tidal barrage, wind turbine, etc. The tunnel may be easily constructed with conventional boring machinery.

The tunnel may have a diameter of between 1 m and 20 m, dependent upon the tidal range of each particular site. For instance, the tunnel may have a diameter of between 2 m and 15 m, in particular 5 m and 10 m. The tunnel diameter may vary along its length.

Any alternative shape of tunnel is envisaged, such as square, or semi-circular. In particular, a square cross section would permit highest flow rates through the inlet (and therefore highest generating power of the power take-off system) throughout the tidal range; i.e. a maximum amount of water could cover the lower-most surface of the tunnel, and a maximum amount of water could fill the upper-most surface of the tunnel. In contrast a circular cross section allows only a minimal inflow of water at the bottom and top of the tunnel, and a maximal amount only in the middle. In a further alternative arrangement, instead of a tunnel an underground cavern could be employed, i.e. having a floor-plan with a higher ratio of area to perimeter than a tunnel to provide reduced resistance and improved efficiency; however, such a structure would be difficult to construct and maintain/secure.

The tunnel may have a length of between 1 km and 100 km, in particular between 10 km and 70 km, more particularly between 30 km and 50 km, for example approximately 40 km. For a 40 km tunnel, flow of seawater during flood or ebb may be less than 15 km/h, in particular less than 10 km/h. This may ensure that there is minimal wear to the tunnel system from fast flowing water. Installing valves and/or turbines may reduce this flow speed still further.

The system may comprise a plurality of storage tunnel portions arranged in parallel with one another. That is, the tunnel may comprise a single connecting tunnel portion from the inlet that splits into a plurality of storage tunnel portions. Alternatively or additionally, the tunnel may comprise a plurality of connecting tunnel portions from the inlet that each leads to a single storage tunnel portion, and/or that each splits into a respective plurality of storage tunnel portions. As a further alternative or additional feature, a single connecting tunnel portion from the inlet may split into a plurality of connecting tunnel portions, each of which leads to a single storage tunnel portion, and/or each of which splits into a respective plurality of storage tunnel portions.

As a further option, the system may be provided with a plurality of inlets. The plurality of inlets may provide seawater to an interconnected network of storage tunnel portions and/or connecting tunnel portions. Alternatively or additionally, each of the plurality of inlets may be connected to a respective connecting tunnel portion, which is in turn connected to at least one storage tunnel portion.

The seawater inlet may have a cross-sectional area that is greater than or equal to a total cross-sectional area of the storage tunnel portion(s). In this way, intake flow speed may be kept down to less than some pre-determined threshold speed, for instance less than 15 km/h, 10 km/h or 5 km/h. Accordingly, marine life may escape the inflow.

Similarly, the passage may contain an air valve, configured to control airflow through the passage. The passage may contain only one air valve or a plurality of air valves. In particular, air within the passages may be held at a pressure different from ambient (e.g. at higher pressure when the tide is in, or at lower pressure when the tide is out); that is, energy may be stored by compressing or rarefying air.

The system may comprise a plurality of passages extending from the or each storage tunnel portion of the tunnel to the external atmosphere. In this way, multiple power take-off systems may be provided.

The passage may have a substantially circular cross-section. In this way, the passage may possess relatively high structural integrity, and/or be easily constructed with conventional boring machinery; however, any shape of passage is envisaged, such as square. The passage may have a diameter of at least 1 m, 5 m, 10 m, 25 m, or 50 m. The passage may have a substantially smaller cross-sectional area and/or diameter than that of the storage tunnel.

The passage may be substantially vertical, but other orientations and/or configurations are also envisaged.

The power take-off system may comprise a turbine. In particular, the turbine may be an air turbine. The turbine may be a bi-directional turbine, for instance a Wells turbine or Hanna turbine. Alternatively, the power take-off system may comprise a traditional uni-directional turbine (i.e. non-bi-direction turbine), together with an airflow rectification system configured to direct air flowing in either direction through the passage through the turbine in a single direction. The air turbine may be any form of turbine conventionally used for generating power from movement of air, for instance wind turbines or other forms of air turbine (for instance those used to generate power from enclosed channel flow).

The power take-off system may comprise an electrical power generator. Alternatively, the power take-off system may comprise a compressor for storing energy as potential energy as compressed air.

The power take-off system may be run even when there is no energy production from the water-flow turbines.

According to a second aspect of the present invention, there is provided a method of extracting power from tides, the method comprising: providing a seawater inlet; constructing a tunnel extending from the inlet into adjacent land mass, including: constructing a substantially horizontal storage tunnel portion within the land mass at a height such that at least a portion of the storage tunnel's cross-section is located substantially between a low neap tide height and high neap tide height at the inlet; and providing a power take-off system; and converting movement of water in the tunnel into usable energy with the power take-off system.

Constructing a tunnel extending from the inlet may comprise constructing the tunnel starting from the location of the seawater inlet. In this way, spoil from constructing the tunnel (for instance by drilling/boring) may be extracted at the location of the inlet, and may for instance be loaded onto a ship for disposal (e.g. by selling) elsewhere. Areas of the UK that have suitable tidal ranges mainly comprise sedimentary rock. This is good for tunnelling (being strong and relatively soft) and produces spoil with a potentially high commercial value. Spoil may be sent via conveyor through the tunnel to the seawater intake area out at sea where it can be loaded straight onto ships for removal and export. The volume of good quality material excavated may be used in many ways for e.g. protecting places vulnerable to sea level rise such as Bangladesh and The Maldives as well as being used in construction, road building, land reclamation etc.

The method may comprise installing a valve at the location of the inlet such that construction of the tunnel may be carried out in the absence of water. The valve may be a cofferdam.

Constructing the tunnel may comprise boring a tunnel using a tunnel boring machine or similar device. The tunnel may be lined, for instance, the tunnel may be lined with concrete or some other suitable system.

The method may comprise constructing a first length of the storage tunnel portion together with a first passage extending from the storage tunnel portion of the tunnel to the external atmosphere, and installing and closing a valve behind the tunnel boring machine. Movement of air through the passage and/or seawater through hydro-turbines may then be converted into usable energy with the power take-off system, whilst the tunnel boring machine may continue to bore additional lengths of tunnel. In this way, additional lengths of tunnel may improve operation of the system after it becomes operationally active.

The direction of the tunnels (other than slope) is not important for functioning of the system. Therefore, the tunnels can be run in directions to coincide with existing distribution infrastructure above ground so that cables and other equipment can run underground out of sight. In the absence of such ancillary benefits, tunnel direction can be decided by the cost and potential revenue of tunnelling through different materials.

The state of the tide varies as it progresses or recedes along the coastline so, with power stations positioned along the coast, it is possible to deliver power on a continuous basis to the grid. Due to the design of the system, energy can also be temporarily stored and released as required to meet fluctuations in demand, for instance by staggering seawater flow into and/or out of each storage tunnel portion, and/or staggering air flow through the passages.

The tunnel(s) may be provided with surface water intakes. In this way, the tunnels may be used to drain floodwater from some areas through strategic location.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

Figure 1:
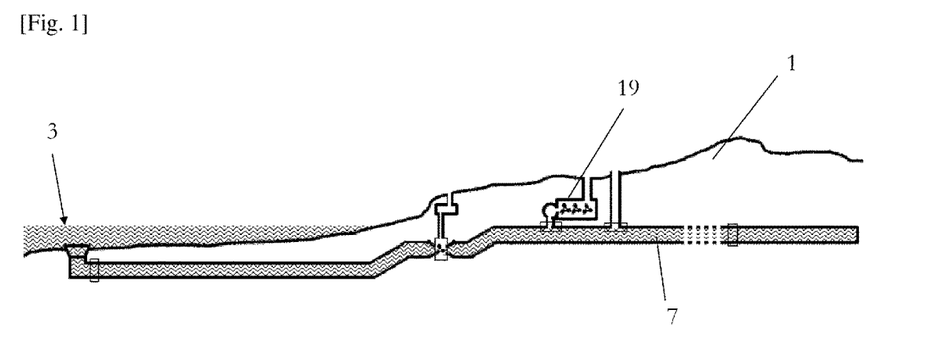
FIG. 1 is a cross-sectional view of an electrical from tidal power system at low tide.

FIG. 1 is a cross-sectional view of an electrical from tidal power system at low tide. The system is located on a stretch of coastline where solid land mass 1 meets the sea 3. An inlet 5 is provided on the sea bed below the surface of the lowest spring tide. From the inlet 5, a tunnel 7 extends into the land mass 1. A plurality of valves/sluice-gates 9 are provided along the tunnel to control flow if desired. In particular, the valves 9 may be operated such that maintenance work may be carried out, or such that timing of energy production may be controlled. The valve 9 closest to the inlet 5 may comprise a junction 9 from which a tunnel or multiple tunnels 7 extend inland through the land mass 1; however, other locations for the junction 9 are also envisaged. For clarity, only one tunnel 7 is shown in FIG. 1.

Located along the tunnel is a set of hydro-turbines 11 for generating power through movement of seawater within the tunnel 7. The hydro-turbines 11 are located at a height below the height of the lowest spring tide, such that they are permanently submerged during operation; however, other positions, in particular enabling 'dry' access to the turbines 11, are also envisaged. The hydro-turbines 11 are connected to a building 15 near the surface by an access/maintenance shaft 13. The building could be constructed below ground as shown, but could also be located above ground if convenient.

From the hydro-turbines 11, the tunnel 7 climbs to a level such that the tunnel's base may be no lower than the lowest spring tide. The tunnel 7 then continues substantially horizontally for a predetermined distance (for instance, forty kilometres, indicated by the broken lines), such that its ceiling may be no higher than the highest spring tide.

A passage 17 is provided in the ceiling of the tunnel 7 for air to be expelled/drawn-in as the tide rises and falls, thereby filling and emptying the substantially horizontal part of the tunnel 7. A power take-off system 19 is provided in the passage 17 such that energy from movement of air through the passage may be converted into useful work, for instance by conversion into electricity. The power take-off system 19 is optional, and in various embodiments the passage may merely allow an equalisation of pressure within the tunnel 7. The power take-off system 19 is provided at a height within the passage substantially above the highest high tide spring (above ground if necessary or desirable), such that the power take-off system 19 will not become contaminated with seawater. The power take-off system is described in more detail with reference to FIGS. 3 and 4.

An access passage and/or bypass airshaft 20 may also be provided, for instance for maintenance purposes.

Figure 2:
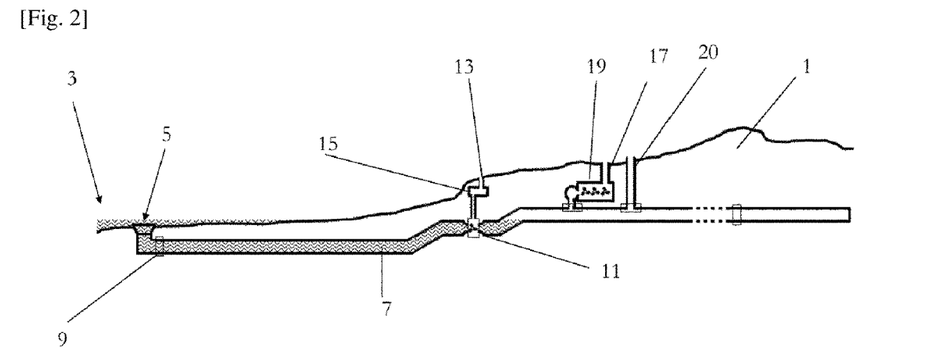
FIG. 2 is a cross-sectional view of the system of FIG. 1, at high tide.

FIG. 2 is a cross-sectional view of the system of FIG. 1, at high tide, showing the different position of water within the system.

Figure 3:
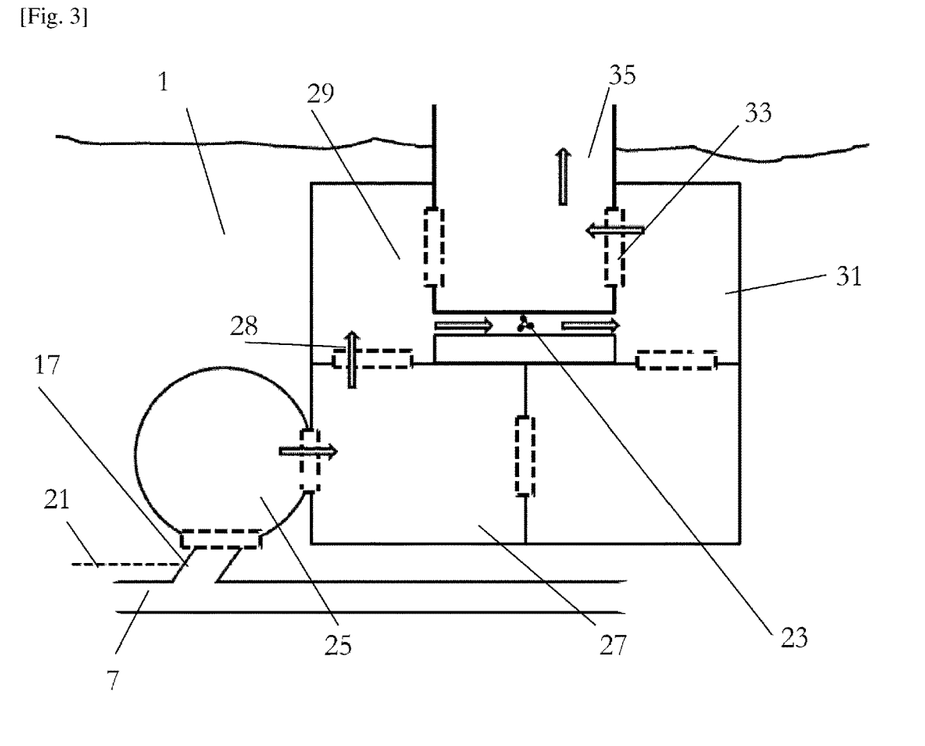
FIG. 3 is a schematic representation of a power take-off system for use in the system of FIG. 1, shown during flood tide.

FIG. 3 is a schematic representation of a power take-off system 19 for use in the system of FIG. 1, shown during flood tide (i.e. incoming tide). The power take-off system 19 is disposed substantially below ground level 1. A part of the horizontal portion of the tunnel 7, and the passage 17 connecting the tunnel 7 to the power take-off system 19, are shown for reference, but are not shown to scale for clarity. The power take-off system is shown disposed in the passage 17 at a height above that of the highest high tide spring 21.

The power take-off system 19 comprises air turbines 23 for converting movement of air into useful work. In order to ensure that air is always supplied to the air turbines 23 from the same direction, a series of air chambers and interconnecting valves are provided.

As seawater floods into the tunnel 7 from the seawater inlet, air (indicated by the arrows) is forced out of the tunnel 7, up through the passage 17, and into a tunnel hall 25. In arrangements in which there are multiple tunnels 7 with multiple passages 17, the tunnel hall 25 may serve as a junction point or manifold where multiple passages 17 from multiple storage tunnels 7 meet. In particular, the tunnel hall 25 may be a tunnel bored in substantially the same manner as the storage tunnels 7, which may also extend substantially horizontally, but at right angles/obliquely to the storage tunnels 7. Thus, in FIG. 3, the tunnel hall 25 is shown having a circular cross section. In preferred arrangements, the tunnel hall 25 may have a similar form (e.g. circular) and size (e.g. diameter) to the storage tunnel 7.

From there, the air passes into a first air chamber 27. In an alternative configuration, each tunnel 7 of a plurality of tunnels may connect directly to a single tunnel hall 25, and a single passage 17 may extend from the single tunnel hall 25 to a single air chamber 27, or the interconnected air chambers (starting with air chamber 27) may form the passage 17.

From the first air chamber 27, air passes through a first valve 28 into a turbine feed chamber 29. The air can then be fed directly into the air turbine(s) 23. Once it has passed through the turbine(s) 23, it is deposited in the turbine exhaust chamber 31. A second valve 33 allows the air to pass from the turbine exhaust chamber 31 into the air stack 35 (i.e. the continuation of the passage 17 to the atmosphere).

Figure 4:
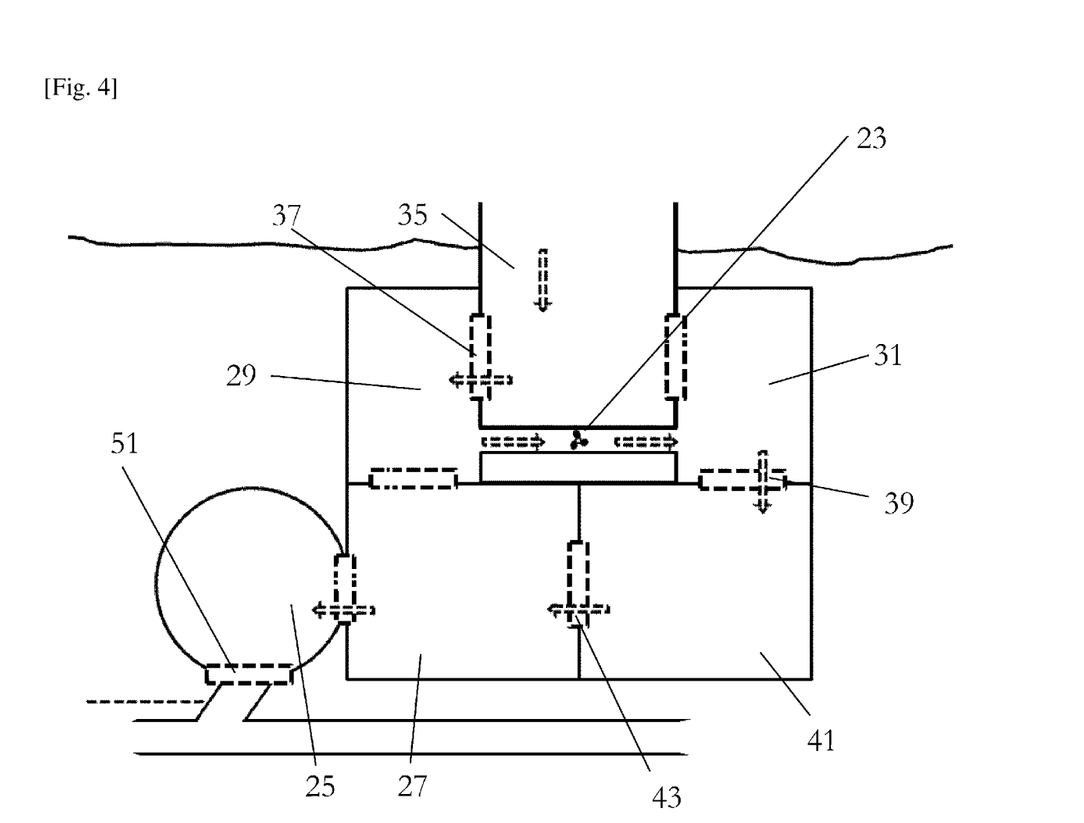
FIG. 4 is a schematic representation of the power take-off system of FIG. 3, shown during ebb tide.

FIG. 4 shows the power take-off system during ebb tide, where air is drawn in through the air stack 35 and passes into the turbine feed chamber 29 via a third valve 37. The air can then be fed directly into the air turbine(s) 23, as before. Once it has passed through the turbine(s) 23, it is deposited in the turbine exhaust chamber 31. A fourth valve 39 allows the air to pass from the turbine exhaust chamber 31 into a second air chamber 41, before being fed by a fifth valve 43 into the first air chamber 27, and back to the tunnel hall 25.

The valves may be one-way valves and/or may be controlled via a valve control system.

This system allows compressed air or a partial vacuum to be stored within the storage tunnel portions 7, tunnel hall 25 and/or air chambers 27, 41 to act as an energy storage system. In this way, the air turbine may operate even when the hydro-turbines are inactive and/or in the lull between tides as well as facilitating the sequencing of pneumatic power generation from the tunnels. A further valve (or series of valves) 51 may be provided between the tunnel hall 25 and the storage tunnel portion(s) 7. Where a series of valves 51 are employed, they may each be independently operable.

In an alternative arrangement, the fifth valve 43 may be dispensed with, together with the tunnel hall 25 and first 27 and second 41 air chambers, such that the first 28 and fourth 39 valves lead directly into the passage 17.

Figure 5:
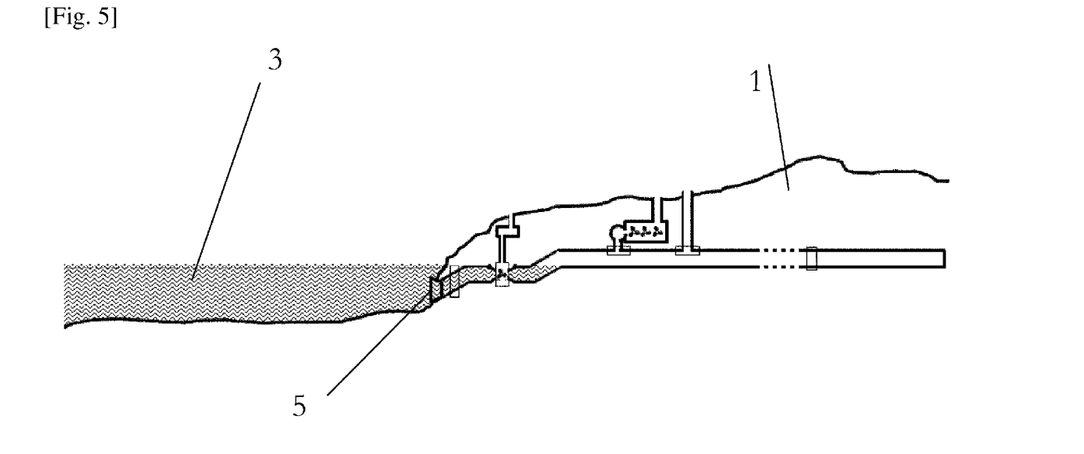
FIG. 5 is a cross-sectional view of an alternative electrical from tidal power system at low tide.

FIG. 5 is a cross-sectional view of an alternative electrical from tidal power system at high tide. The system is identical to that of FIGS. 1 and 2 except that the solid land mass 1 in which it is located meets the sea 3 at a steeper slope. Thus, the inlet 5 is provided on a sub-surface cliff face, below the surface of the lowest spring tide.

Figure 6:
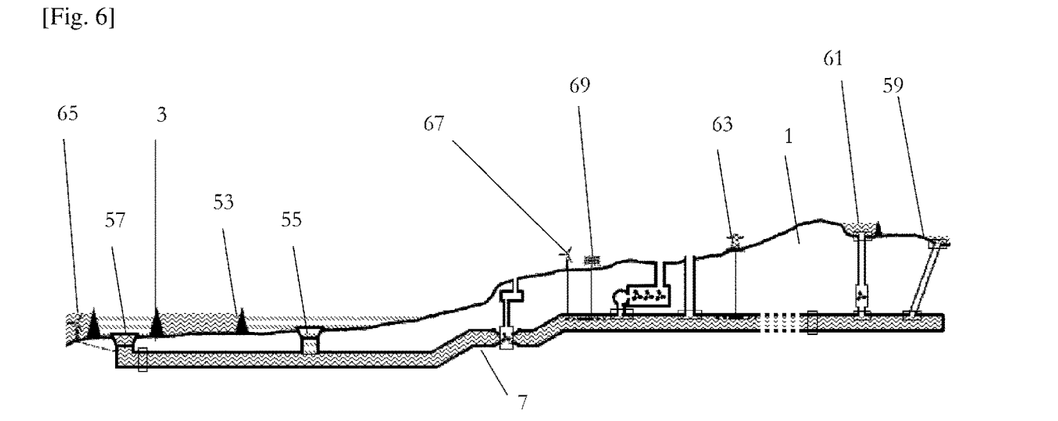
FIG. 6 shows a cross-sectional view of a further alternative electrical from tidal power system.

FIG. 6 shows a cross-sectional view of a further alternative electrical from tidal power system that incorporates various additional features.

The tunnel 7 could be provided with more than one inlet. Spoil from tunnelling excavations (or other sources of building material) could be used to build one or more tidal walls 53, forming (for instance) a coastal tidal barrage with a first inlet 55, and/or an at-sea tidal lagoon with a second inlet 57. These could be constructed together, or either/both could be retrofitted to an existing tunnel system. In this way, sea level 3 may vary with the tides, but the tidal barrage 55 and/or lagoon 57 could be controlled (e.g. with conventional electricity-generating turbines) to maintain water levels such that the tunnels could be used to generate power on demand.

Alternatively or additionally, a tunnel system could be used in relation to an existing tidal lagoon/barrage. In this way, the tunnels could be used to increase system capacity and optimise use of existing turbines.

The tunnels could be provided with a flood-relief system 59 to help reduce the risk of flooding of rivers, reservoirs etc. That is, a channel could be provided from flood-prone areas to the tunnel 7 to divert fresh water into the tunnel 7. In particular, the length and construction method of the tunnels would permit locating the tunnel 7 directly under, or at least very close to, such flood-prone areas.

The system could be further provided with a pumped-storage system 61; for instance, a conventional hydroelectric system in which water from the tunnel 7 is pumped to a surface and/or underground reservoir for storage during low-demand periods, for immediate recovery during high-demand periods. Again, the length and construction method of the tunnels would permit locating the tunnel 7 directly under, or at least very close to existing reservoirs and/or other suitable locations for pumped-storage.

Another advantage of the length and construction method of the tunnels would permit locating the tunnel 7 directly under, or at least very close to, the existing electricity distribution system 63 (grid), such that the inlets may be located in remote areas, the power take-off system could be provided in remote areas, but electrical transmission systems could be constructed underground during tunnel construction to allow connection to the existing grid without impacting the natural environment.

That is, the tunnel may act as a convenient way of transmitting electricity underground. This therefore allows other energy generation systems (or energy users) to be located away from the existing electrical distribution network. For example, FIG. 6 shows connection of a tidal stream generator 65, wind turbine 67, and solar photovoltaic system 69 to an electrical system within the tunnel system for connection to the electricity distribution system 63.

Figure 7:
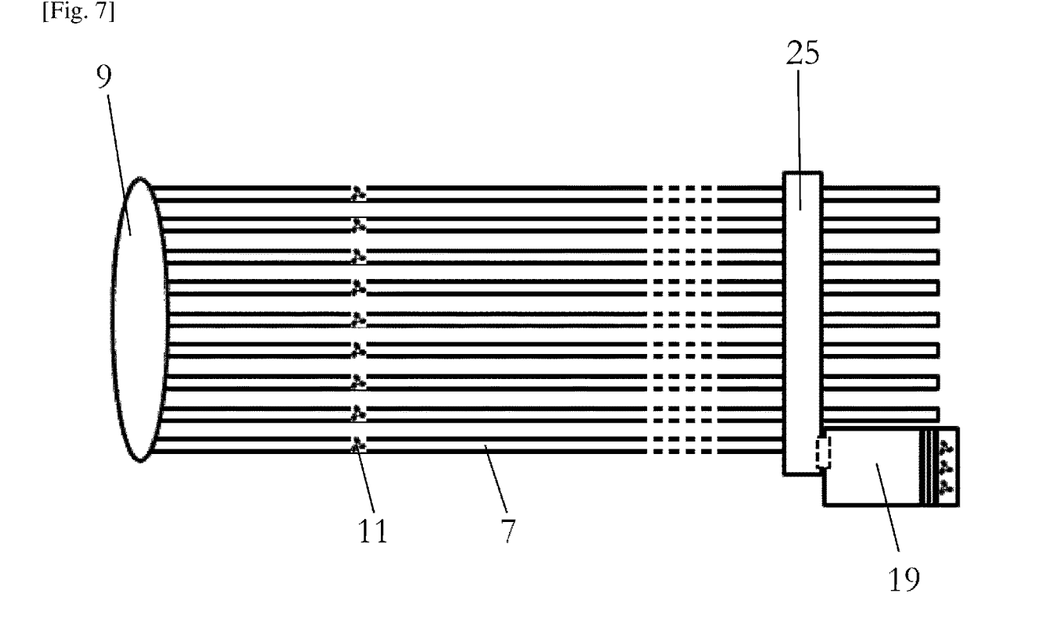
FIG. 7 shows a plan view of a still further alternative electrical from tidal power system.

FIG. 7 shows a plan view of part of a still further alternative electrical from tidal power system. Without loss of generality, the inlet(s) are not shown, but the junction 9 is shown to the left, from which extend a plurality of independent tunnels 7. It is conceivable that the junction 9 could be replaced by a single inlet, or a plurality of separate inlets, with at least some of the tunnels 7 being unconnected to others below the relevant sea levels discussed above. Hydro-turbines 11 are provided in-line within the tunnels 7 as discussed above. A single tunnel hall 25 extends across all tunnels 7 connecting them together above the relevant sea levels discussed above, forming part of a pneumatic power take-off system 19.

Figure 8:
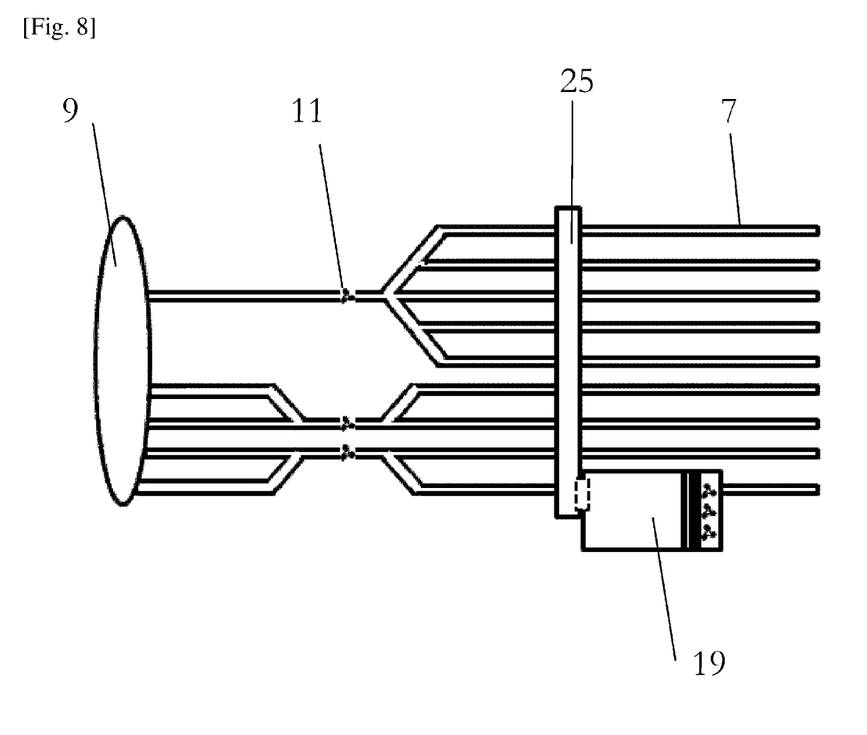
FIG. 8 shows a plan view of a yet further alternative electrical from tidal power system.

FIG. 8 shows a plan view of a yet further alternative electrical from tidal power system in which various further junctions are shown connecting respective tunnels 7 together either seaward or landward of the hydro-turbines 11.

The invention claimed is:

1. A system for extracting power from tides, the system comprising:
   a seawater inlet disposed at a height below a lowest spring low tide height at the inlet;
   a power take-off system configured to convert movement of water into usable energy; and
   a tunnel extending from the inlet into adjacent land mass, a portion of the tunnel comprising:
   a substantially horizontal storage tunnel portion disposed within the land mass at a height such that at least a part of the storage tunnel portion's cross-section is located substantially between a low neap tide height and high neap tide height at the inlet; and
   wherein the power take-off system is arranged to convert movement of water in the tunnel into usable energy.

2. The system of claim 1, wherein the seawater inlet is disposed below low tide height.

3. The system of claim 1, further comprising a passage extending from the storage tunnel portion of the tunnel to the external atmosphere, and wherein the power take-off system is configured to convert movement of air through the passage, propelled by movement of water in the tunnel, into usable energy.

4. The system of claim 1, wherein the tunnel is enclosed.

5. The system of claim 1, wherein the power take-off system comprises water-flow turbines disposed within the tunnel.

6. The system of claim 1, further comprising a valve disposed within the tunnel.

7. A method of extracting power from tides, the method comprising:
   providing a seawater inlet disposed at a height below a lowest spring low tide height at the inlet;
   providing a power take-off system;
   by constructing a tunnel extending from the inlet into adjacent land mass, including:
   constructing a substantially horizontal storage tunnel portion within the land mass at a height such that at least a portion of the storage tunnel's cross-section is located substantially between a low neap tide height and high neap tide height at the inlet; and
   converting movement of water in the tunnel into usable energy with the power take-off system.

* * * * *